United States Patent
Bock et al.

(10) Patent No.: US 10,376,102 B2
(45) Date of Patent: Aug. 13, 2019

(54) BLENDER WITH QUIET SHIELD

(71) Applicant: Hamilton Beach Brands, Inc., Glen Allen, VA (US)

(72) Inventors: Brian Bock, Midlothian, VA (US); David Matthew Schandel, Henrico, VA (US); Paul Diaz, Richmond, VA (US); Benjamin H Branson, III, Mechanicsville, VA (US)

(73) Assignee: Hamilton Beach Brands, Inc., Glen Allen, VA (US)

( * ) Notice: Subject to any disclaimer, the term of this patent is extended or adjusted under 35 U.S.C. 154(b) by 154 days.

(21) Appl. No.: 15/654,330

(22) Filed: Jul. 19, 2017

(65) Prior Publication Data
US 2019/0021550 A1    Jan. 24, 2019

(51) Int. Cl.
*A47J 43/07* (2006.01)
*A47J 43/046* (2006.01)
*B01F 15/00* (2006.01)
*B01F 7/18* (2006.01)

(52) U.S. Cl.
CPC ......... *A47J 43/0716* (2013.01); *A47J 43/046* (2013.01); *B01F 7/18* (2013.01); *B01F 15/00538* (2013.01)

(58) Field of Classification Search
CPC ............... A47J 43/046; A47J 43/0716; B01F 15/00538; B01F 15/00779; B01F 15/00896; B01F 2215/0026; B01F 7/162; B01F 7/18
See application file for complete search history.

(56) References Cited

U.S. PATENT DOCUMENTS

| | | | | |
|---|---|---|---|---|
| 185,622 A | * | 12/1876 | Brown | A61H 33/06 607/83 |
| 2,143,239 A | * | 1/1939 | Foltz | F25D 23/12 126/37 R |
| 2,300,405 A | * | 11/1942 | Cook | F24C 15/023 126/275 R |
| 2,849,868 A | * | 9/1958 | Anderson | A23G 9/12 62/342 |
| 4,297,038 A | * | 10/1981 | Falkenbach | A47J 43/046 241/282.1 |
| 4,349,120 A | * | 9/1982 | DiNardo | B65D 43/164 16/267 |

(Continued)

*Primary Examiner* — Tony G Soohoo
(74) *Attorney, Agent, or Firm* — Alexander D. Raring

(57) ABSTRACT

A blender comprises a housing and a shield. The housing has a first portion enclosing a motor and a second portion for selectively receiving a blender jar assembly. The second portion defines an opening through which the blender jar assembly is selectively received. The shield is selectively coupled to the second portion via a substantially vertical pivot point that enables the shield to be selectively pivoted between a closed position closing off the opening in the second portion and an open position enabling the blender jar assembly to be inserted into or removed from the second portion. The pivot point comprises an overcenter cam that urges the shield toward the closed position when the shield is positioned between the closed position and a maximum displacement point of the overcenter cam and that urges the shield toward the open position when the shield is positioned between the open position and the maximum displacement point.

11 Claims, 19 Drawing Sheets

(56) References Cited

U.S. PATENT DOCUMENTS

| | | | | |
|---|---|---|---|---|
| 4,883,144 A * | 11/1989 | Haushalter | ............ | A47J 43/07 181/198 |
| 4,889,209 A * | 12/1989 | Sears | ............ | G10K 11/16 181/200 |
| 4,892,413 A * | 1/1990 | Vats | ............ | A47J 43/0716 181/200 |
| 5,184,684 A * | 2/1993 | Kohlman | ............ | A62C 13/78 169/51 |
| 5,272,285 A * | 12/1993 | Miller | ............ | F04B 39/0033 181/202 |
| 5,432,306 A * | 7/1995 | Pfordresher | ............ | A47J 43/07 181/198 |
| 5,533,797 A * | 7/1996 | Gelber | ............ | A47J 43/07 206/320 |
| 5,696,358 A * | 12/1997 | Pfordresher | ............ | A47J 43/07 181/198 |
| 5,957,577 A * | 9/1999 | Dickson | ............ | A47J 43/07 366/197 |
| 6,019,238 A * | 2/2000 | Kindig | ............ | A47B 77/08 16/266 |
| D432,864 S * | 10/2000 | Kindig | ............ | D7/412 |
| 6,571,908 B2 * | 6/2003 | Bohannon | ............ | A47J 43/0716 160/201 |
| 6,766,879 B2 * | 7/2004 | Eilers | ............ | A47J 42/38 181/198 |
| 7,520,663 B1 * | 4/2009 | Kolar | ............ | A47J 43/07 312/326 |
| D592,903 S * | 5/2009 | Olson | ............ | D7/376 |
| D637,862 S * | 5/2011 | Fouquet | ............ | D7/376 |
| 8,087,603 B2 * | 1/2012 | Kolar | ............ | A47J 43/0716 181/198 |
| 8,287,180 B2 * | 10/2012 | Kolar | ............ | A47J 43/0716 366/347 |
| D770,225 S * | 11/2016 | McConnell | ............ | D7/376 |
| D838,538 S * | 1/2019 | Carlson | ............ | D7/378 |
| 2003/0042805 A1 * | 3/2003 | Bates | ............ | H02K 5/20 310/58 |
| 2005/0152215 A1 * | 7/2005 | Stuart | ............ | A47J 43/0716 366/205 |
| 2010/0242497 A1 * | 9/2010 | Bertone | ............ | A23G 9/045 62/1 |
| 2016/0374515 A1 * | 12/2016 | Stuart | ............ | A47J 43/0716 241/30 |
| 2019/0021549 A1 * | 1/2019 | Bock | ............ | A47J 43/046 |
| 2019/0021550 A1 * | 1/2019 | Bock | ............ | A47J 43/0716 |

* cited by examiner

BLENDER WITH QUIET SHIELD

BACKGROUND OF THE DISCLOSURE

The present disclosure relates generally to small appliances, and more particularly to blenders for blending foodstuff.

Blenders are a common household appliance and are capable of mixing liquids and chopping dry foods. Blenders are also useful for liquefying fruits and vegetables and for blending solids with liquids. A typical blender includes a blender jar assembly comprising a collar and a container that sits on top of a blender base that encloses a motor. The collar includes a blending tool rotatably mounted thereto. The blending tool is rotatably engageable with a drive shaft of the motor in an operating configuration. Foodstuff is placed into the container and the blender jar assembly is engaged with the blender base. The foodstuff is blended within the volume defined by the blender jar, and the blender jar assembly is removed from the blender base to dispense or pour the blended foodstuff.

Blenders can be noisy during operation, but retail blenders do not employ sound enclosures because of a lack of counter space in most homes and the additional cost to provide such an enclosure. More specifically, retail blenders are generally placed under kitchen cabinetry which greatly limits headspace above the blender. A door or enclosure that pivots upwardly to provide access to the blender jar assembly would be inoperable in a consumer's home. Such upwardly pivoting doors are typically acceptable in commercial kitchens in which the added height of the open door is not a problem.

The blender of the following disclosure overcomes at least one of the above-described disadvantages of conventional blenders.

BRIEF SUMMARY OF THE DISCLOSURE

A blender for blending foodstuff is disclosed herein. In one embodiment of the subject device, a blender comprises a housing and a shield. The housing has a first portion enclosing a motor and a second portion for selectively receiving a blender jar assembly adapted to contain foodstuff to be blended. The second portion defines an opening through which the blender jar assembly is selectively received. The shield is selectively coupled to the second portion via a substantially vertical pivot point. The pivot point enables the shield to be selectively pivoted between a closed position, wherein the opening in the second portion is closed off, and an open position, wherein the blender jar assembly can be inserted into or removed from the second portion via the opening. The pivot point comprises an overcenter cam that urges the shield toward the closed position when the shield is positioned between the closed position and a maximum displacement point of the overcenter cam and that urges the shield toward the open position when the shield is positioned between the open position and the maximum displacement point of the overcenter cam.

The shield may move upward as the shield is pivoted from the closed position to the maximum displacement point of the overcenter cam. The shield may move downward as the shield is pivoted from the maximum displacement point of the overcenter cam to the open position. The shield may move upward as the shield is pivoted from the open position to the maximum displacement point of the overcenter cam. The shield may move downward as the shield is pivoted from the maximum displacement point of the overcenter cam to the closed position.

The overcenter cam may comprise a top cam portion, a cooperating bottom cam portion, and a spring that urges the top cam portion and the bottom cam portion toward each other. The shield may be selectively coupled to the second portion via the top cam portion such that pivoting the shield causes the top cam portion to correspondingly rotate and such that rotating the top cam portion causes the shield to correspondingly pivot. The shield may comprise a pivot post selectively insertable into a corresponding cavity in the top cam portion. The shield pivot post and the cavity of the top cam portion may each comprise cooperating engaging surfaces.

The blender jar assembly may comprise a container selectively coupled to a base. The base comprises a floor and a sidewall connected to and extending from the floor to form a chamber for receiving at least a portion of the foodstuff to be blended. The base further comprises one or more rotatable blades. The one or more rotatable blades may be fully contained within the chamber formed by the floor and the sidewall. The one or more rotatable blades may not extend beyond a rim of the sidewall. The sidewall may comprise one or more protrusions to increase agitation of the foodstuff within the chamber.

BRIEF DESCRIPTION OF THE SEVERAL VIEWS OF THE DRAWINGS

The foregoing summary, as well as the following detailed description of the disclosure, will be better understood when read in conjunction with the appended drawings. For the purpose of illustrating the disclosure, there are shown in the drawings embodiments which are presently preferred. It should be understood, however, that the disclosure is not limited to the precise arrangements and instrumentalities shown. In the drawings.

DETAILED DESCRIPTION OF THE DISCLOSURE

Figure 1:
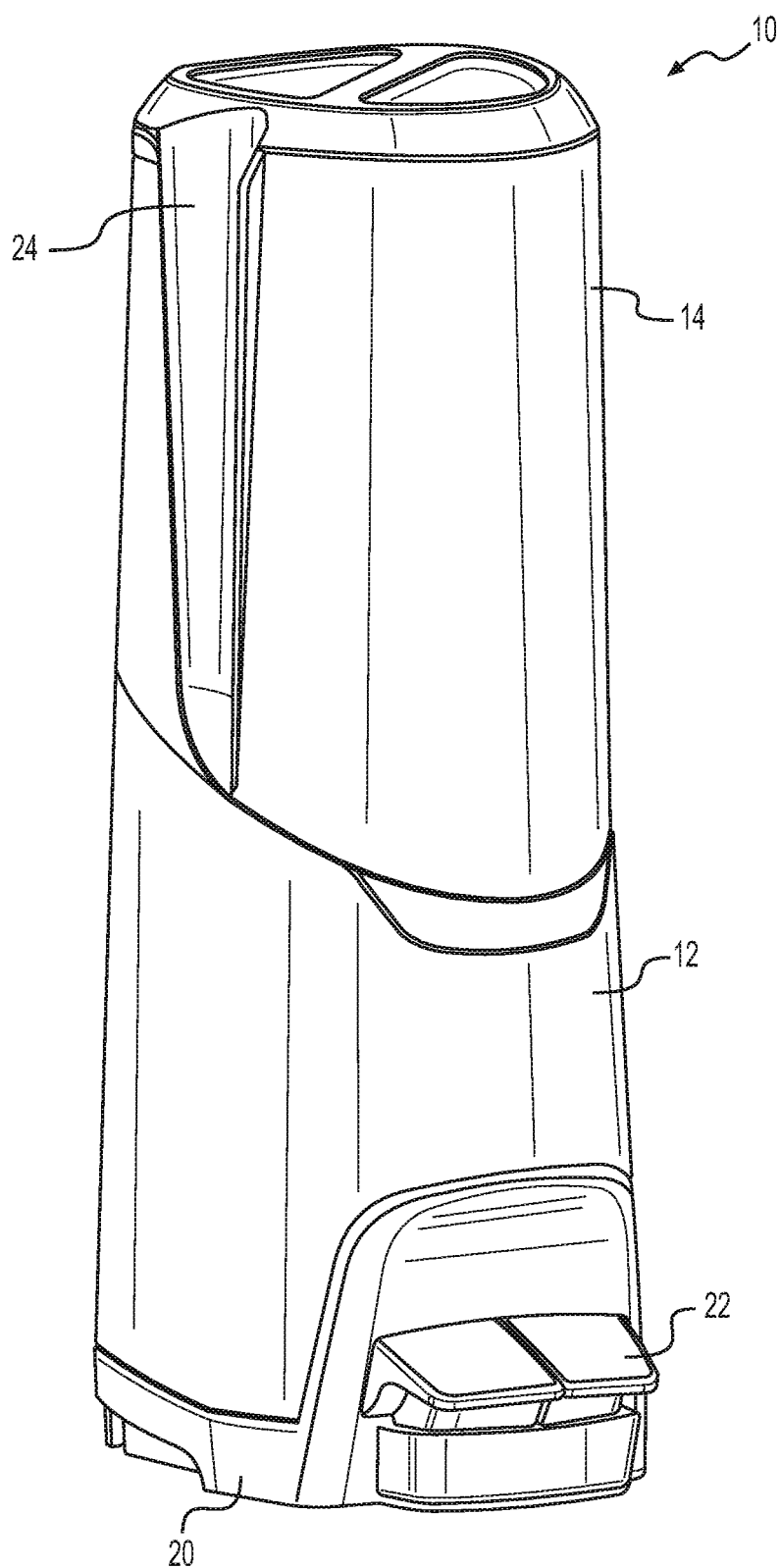
FIG. 1 is a top left perspective view of a blender with its shield closed, according to one embodiment of the invention.
Figure 2:
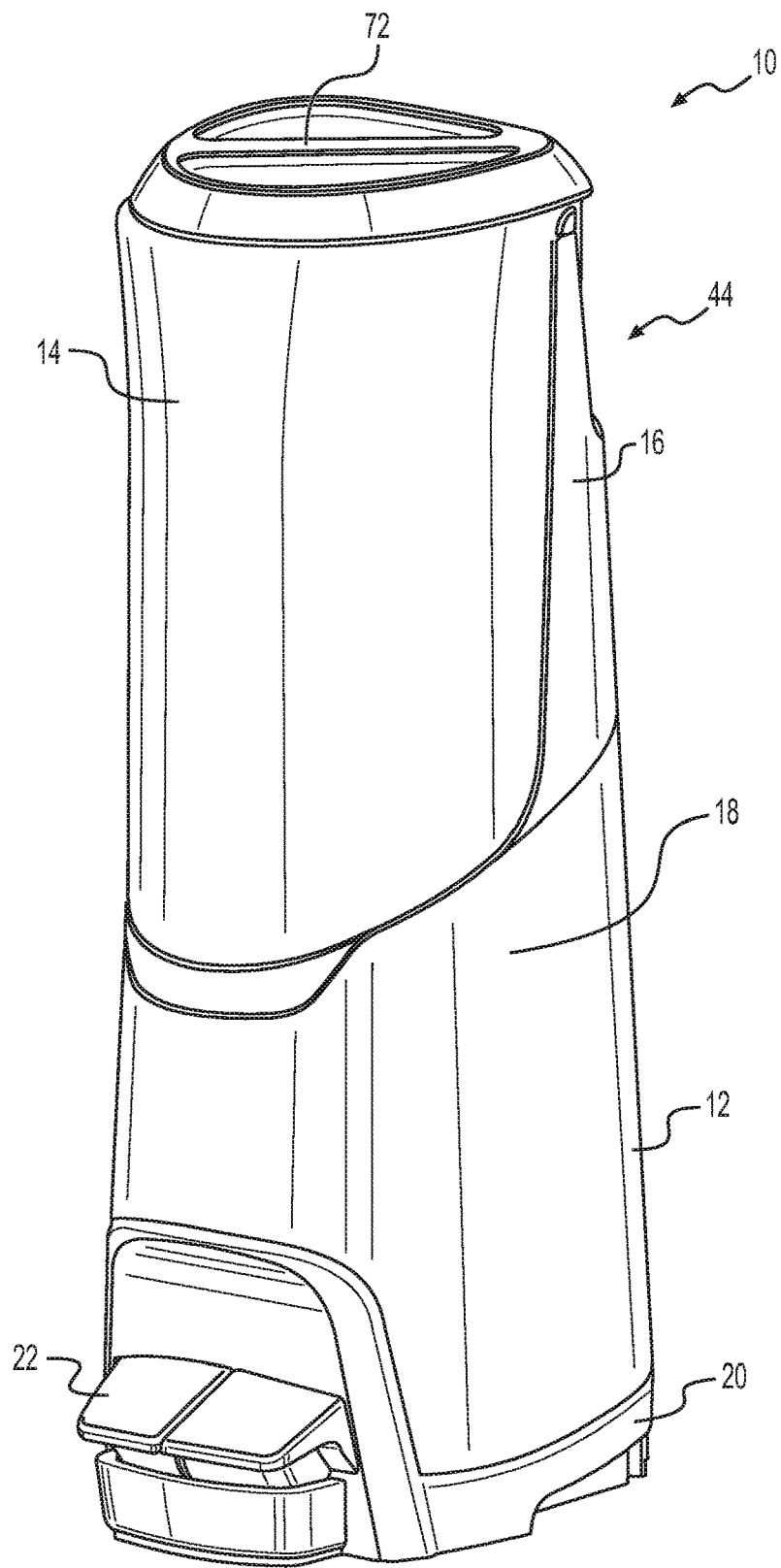
FIG. 2 is a top right perspective view of the blender of FIG. 1.
Figure 3:
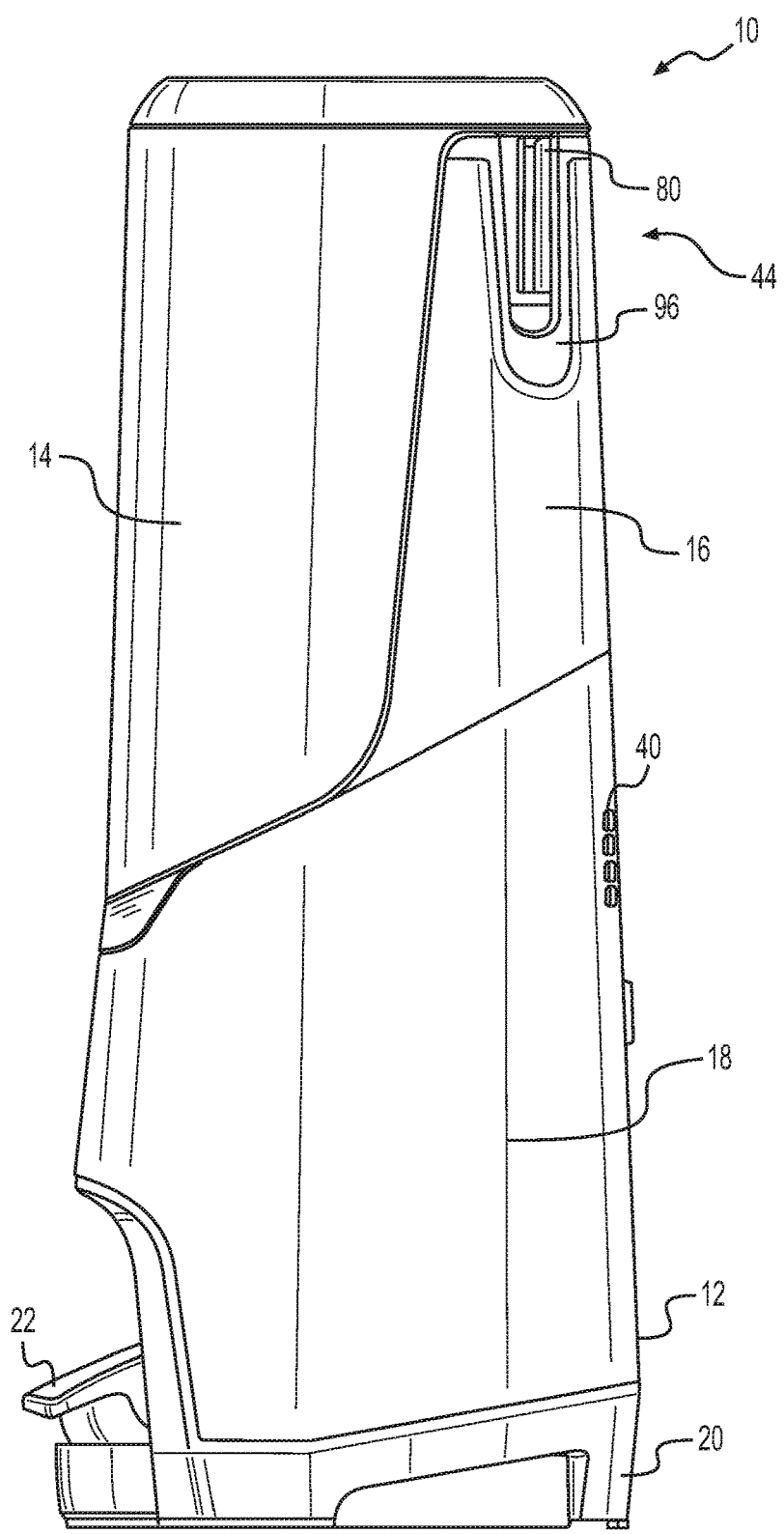
FIG. 3 is a right side view of the blender of FIG. 1.
Figure 4:
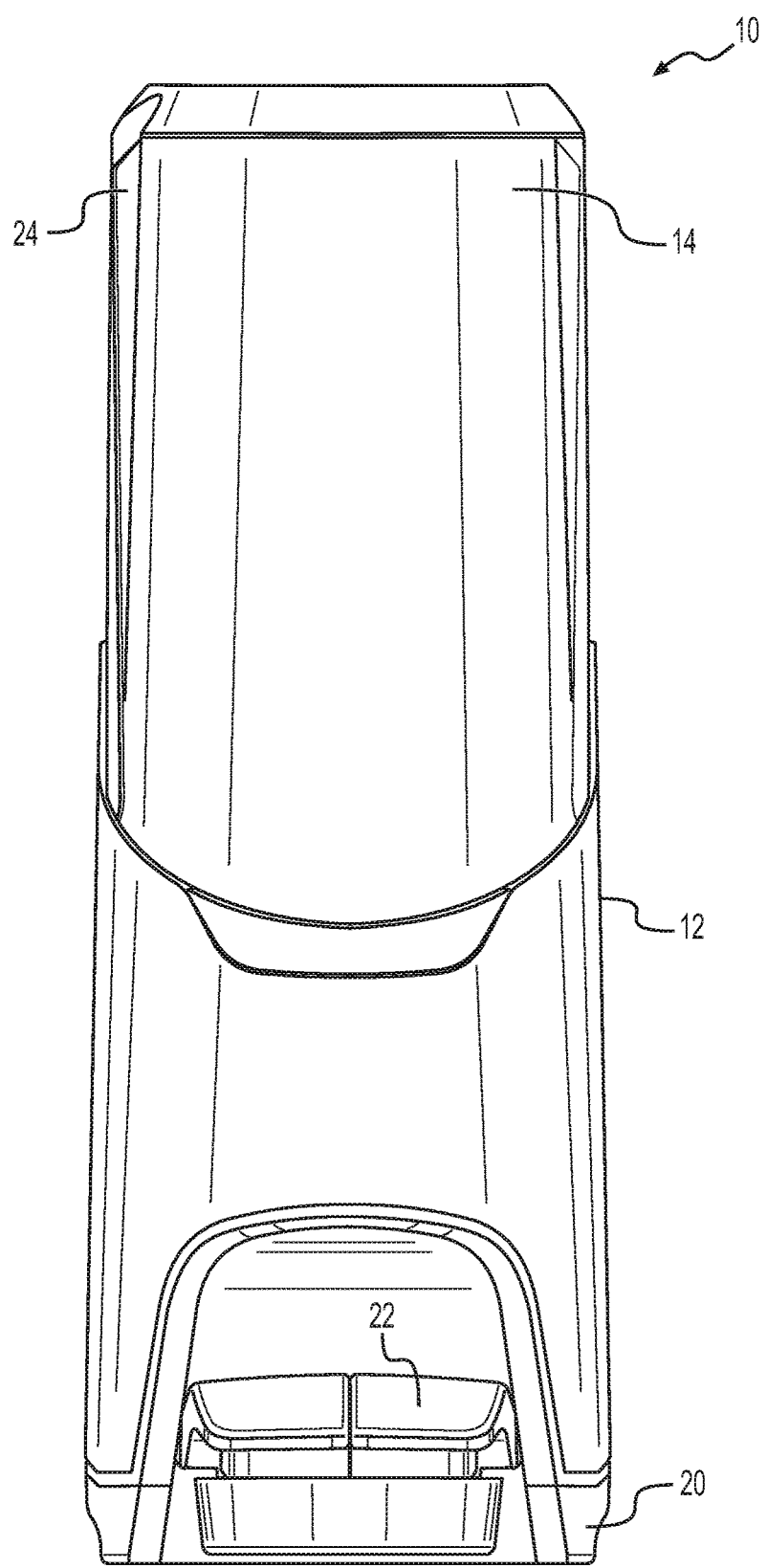
FIG. 4 is a front view of the blender of FIG. 1.

Certain terminology is used in the following description for convenience only and is not limiting. The words "lower," "bottom," "upper," and "top" designate directions in the drawings to which reference is made. The words "inwardly," "outwardly," "upwardly" and "downwardly" refer to directions toward and away from, respectively, the geometric center of the device, and designated parts thereof, in accordance with the present disclosure. Unless specifically set forth herein, the terms "a," "an" and "the" are not limited to one element, but instead should be read as meaning "at least one." The terminology includes the words noted above, derivatives thereof and words of similar import.

Referring to the drawings in detail, wherein like numerals indicate like elements throughout, FIGS. 1-17 illustrate a blender or other similar mixing device in accordance with a preferred embodiment of the present disclosure. The blender 10 of embodiments of the present disclosure comprises a housing 12 and a shield 14. The housing 12 has a blender base 20 that sits upon a surface such as a countertop, a first or bottom portion 18 that encloses a motor 42 (seen in FIG. 17) and various other conventional blender components, and a second or top portion 16 that defines a chamber 26 for selectively receiving a blender jar assembly 48 adapted to contain foodstuff to be blended. A control panel 22 may be positioned on the exterior of the housing. The control panel 22 may comprise one or more input elements (buttons, switches, knobs, etc.) and/or one or more output elements (lights, buzzers, etc.) (two lever-type switches are illustrated). Control panel 22 may comprise a touch sensitive input, a digital display interface, or the like that allows a user to engage and operate the appliance.

Figure 5:
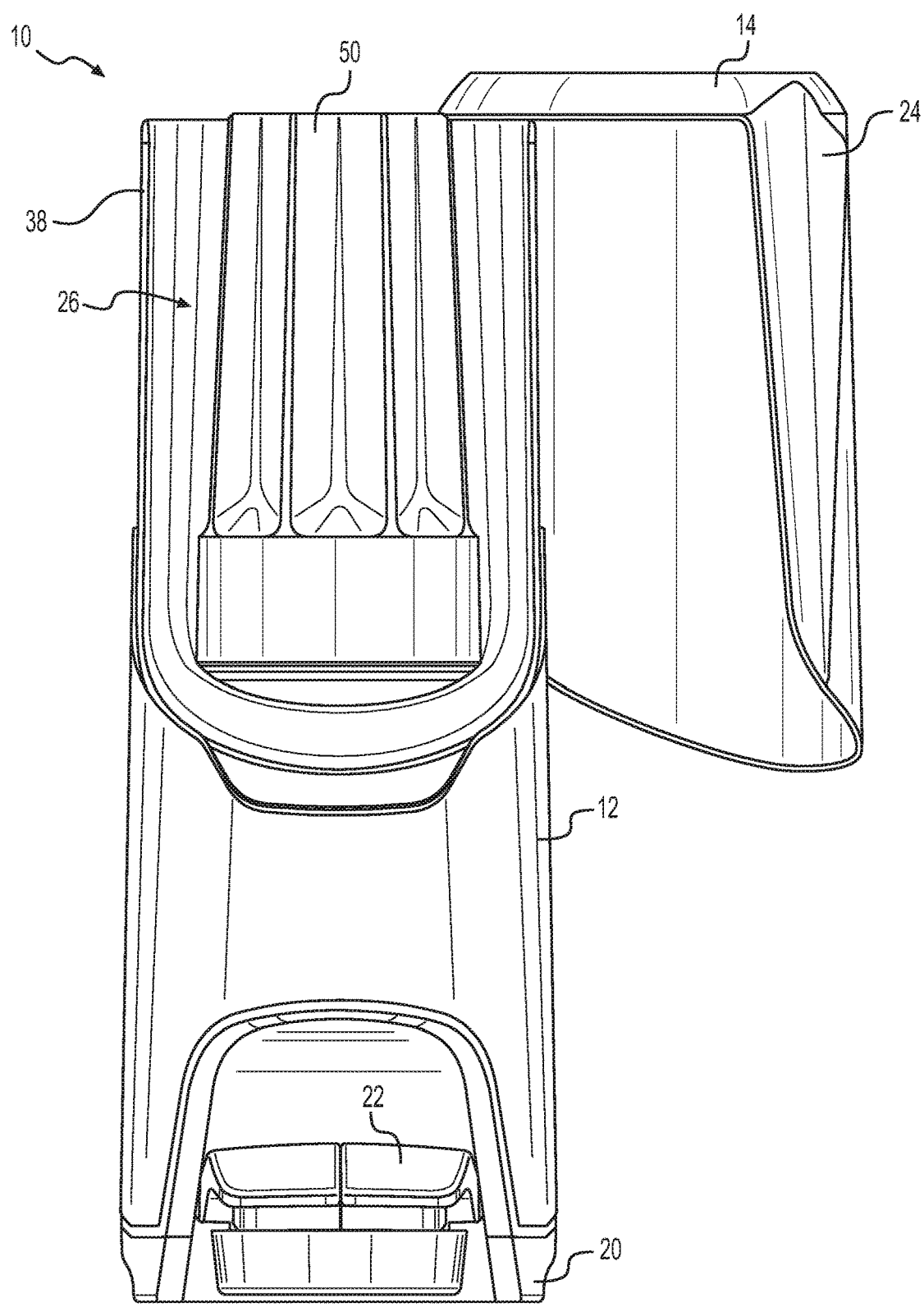
FIG. 5 is a front view of the blender of FIG. 1, with its shield open and its blender jar assembly in place.
Figure 6:
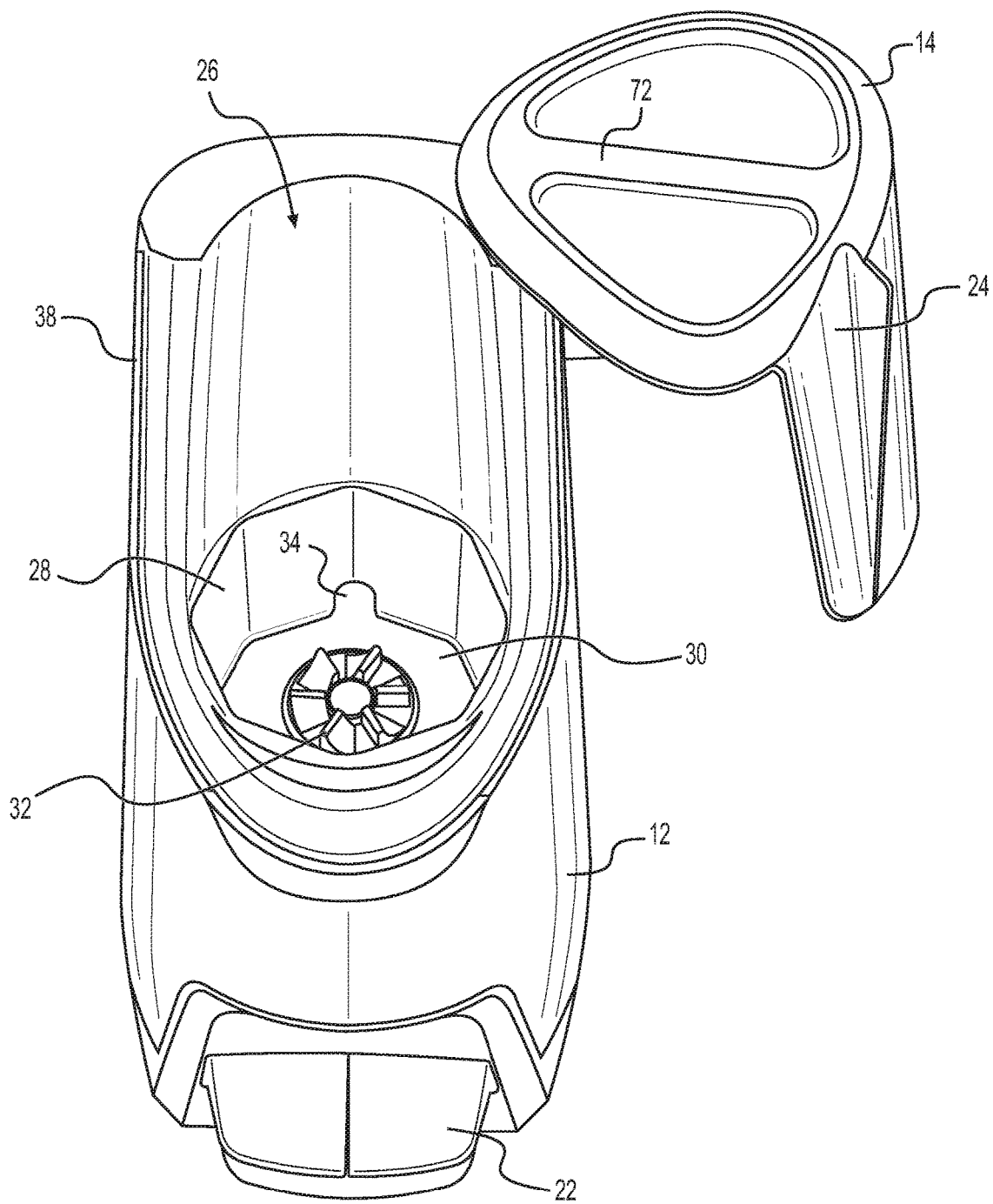
FIG. 6 is a top front perspective view of the blender of FIG. 1, with its blender jar assembly removed.
Figure 7:
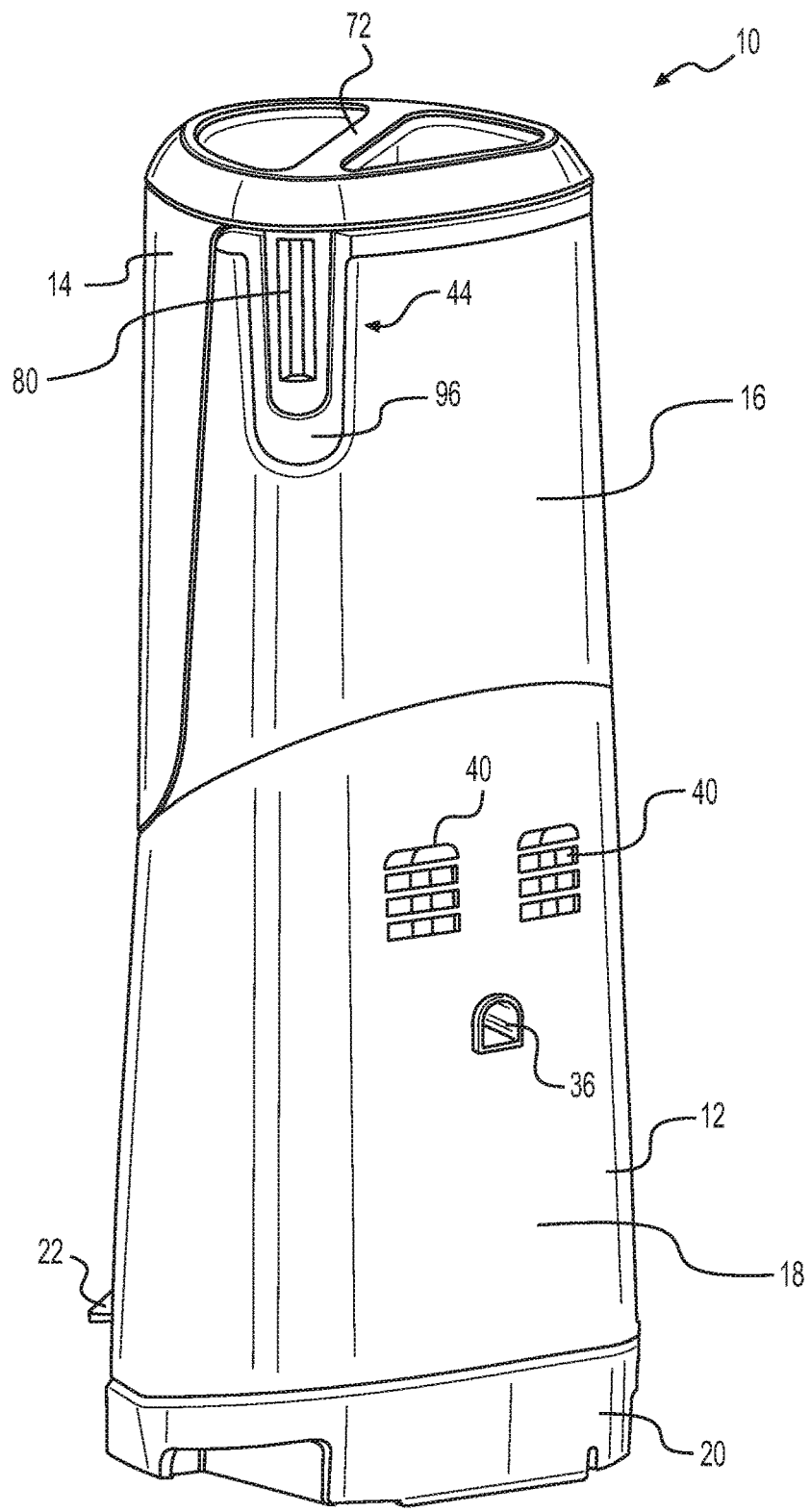
FIG. 7 is a top rear perspective view of the blender of FIG. 1.

The second portion 16 defines an opening 38 through which the blender jar assembly 48 is selectively received or removed. The shield 14 may be selectively pivoted between a closed position (illustrated in FIGS. 1-4) closing off the opening 38 in the second portion 16 and an open position (illustrated in FIG. 5) enabling the blender jar assembly 48 to be inserted into or removed from the second portion 16. The shield 14 pivots left-to-right to open and right-to-left to close in the illustrated embodiment, but alternative embodiments could have the pivot point on the opposite side of the housing such that the shield pivots right-to-left to open and left-to-right to close. FIG. 5 illustrates one embodiment of the blender 10 where the shield 14 open and the blender jar assembly 48 in place for blending. The blender jar assembly comprises a base 52 and a container portion 50 selectively affixable to the base. Only the container portion 50 of the blender jar assembly is visible in FIG. 5. The blender jar assembly 48 is described further below. FIG. 6 illustrates the blender 10 with the blender jar assembly removed. As seen in FIG. 6, the chamber 26 for receiving the blender jar assembly comprises a lower wall portion 28 that is shaped and sized to nest with the base 52 to minimize movement of the base during operation of the blender. The chamber 26 further comprises a floor portion 30 and a drain hole 34 where the floor portion 30 and lower wall portion 28 meet to drain any liquid that might spill into the chamber 26. The drain hole 34 leads to a drain channel that directs fluid out of the chamber 26 via exit hole 36 (seen in FIG. 7). The chamber further comprises a clutch coupling 32 that operatively engages with a coupling clutch 54 of the base when the blender jar assembly 48 is in position in the chamber 26 for blending. Operation of the motor 42 conventionally rotates the clutch coupling 32.

Figure 8:
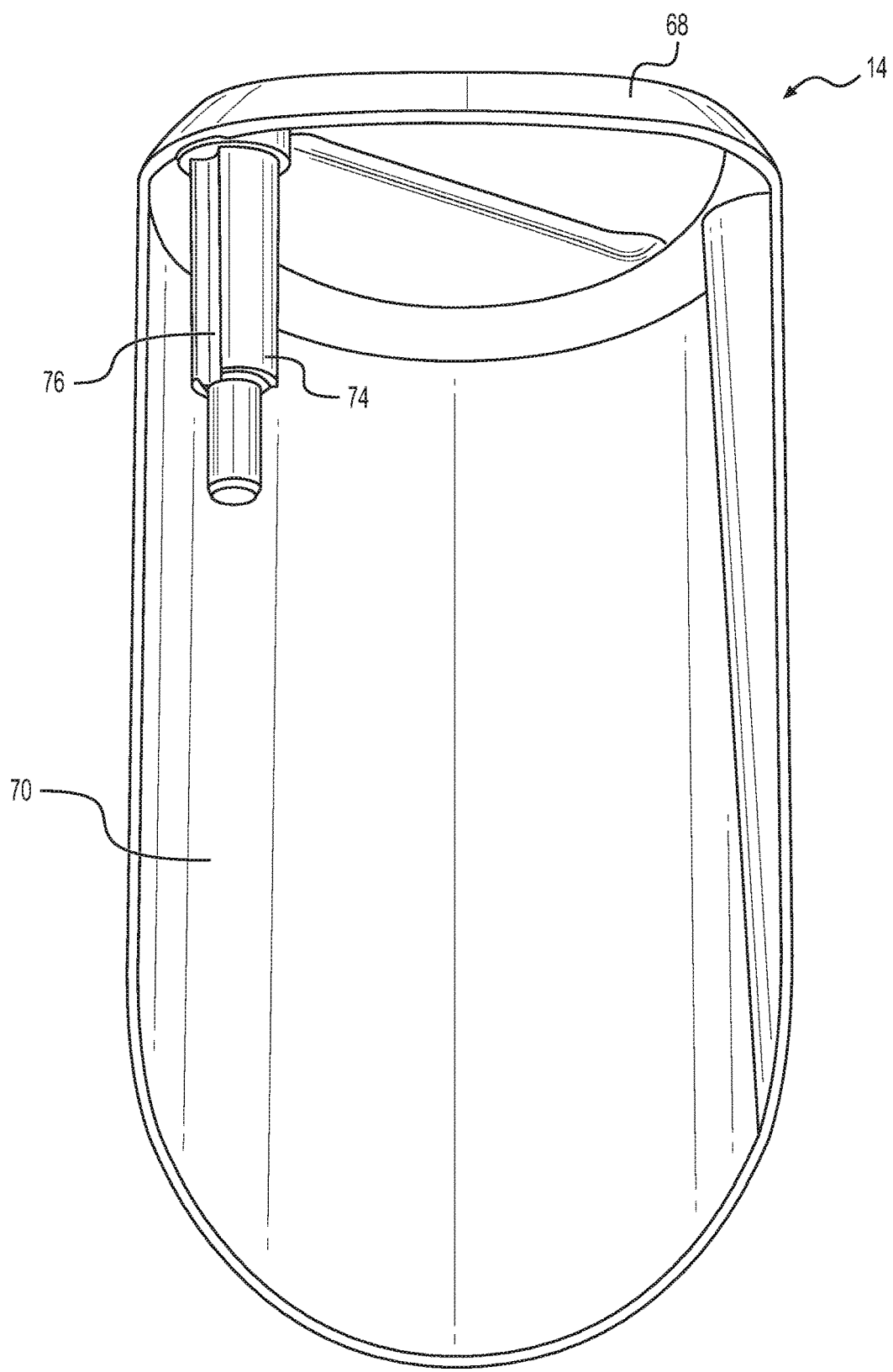
FIG. 8 is a bottom rear perspective view of the shield removed from the blender of FIG. 1.
Figure 9:
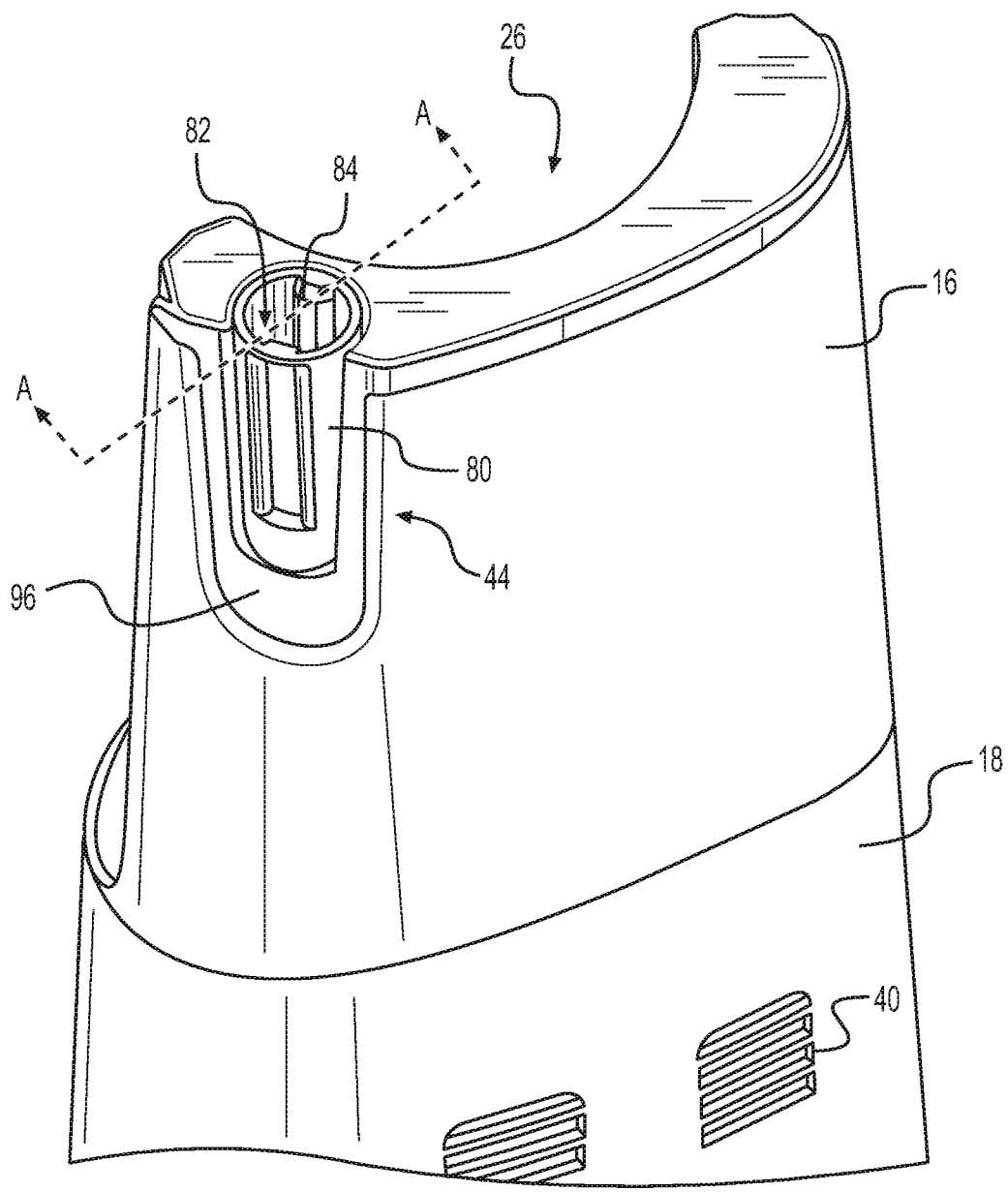
FIG. 9 is a top rear perspective view of a portion of the blender of FIG. 1, with its shield removed.

The shield 14 may be selectively removable from the blender 10 to facilitate cleaning. As best seen in FIG. 8, in which the shield is shown separated from the blender, the shield 14 comprises a top portion 68 and an outwardly curved face portion 70. A channel 24 formed in the face portion 70 functions as an integrated handle to enable a user to readily open and close the shield 14 (such a handle-like mechanism may be implemented in any other suitable fashion and in any other suitable location). A ridge 72 is formed in the top portion 68 (by depressions on opposing sides) to enable a user to grasp the shield and pull upward to selectively remove the shield from the blender. A substantially vertical post 74 projects downward from the top portion 68. Two substantially vertical keyways 76 (only one is visible in FIG. 8) are defined in opposing sides of the post 74. As described further below, the post 74 and keyways 76 enable the selective coupling of the shield 14 to the top of the housing 12. Although not illustrated, the blender may comprise a gasket to provide a seal between the shield 14 and the opening 38. Such a gasket may be affixed to the edge of the shield or around the perimeter of the opening 38.

The shield 14 is selectively coupled to the second portion 16 via a substantially vertical pivot point 44 (best seen in FIGS. 9-12). The pivot point 44 enables the shield 14 to be selectively pivoted between the closed position and the open position. The pivot point 44 comprises an overcenter cam. As the shield is pivoted from the closed position toward the open position, the structure of the two portions of the overcenter cam (described below) cause the shield to move slightly upward until the maximum displacement point of the overcenter cam is reached. As the shield continues to pivot toward the open position, the shield moves slightly downward until the fully open position is reached. As the shield is pivoted from the open position toward the closed position, the structure of the two portions of the overcenter cam cause the shield to move slightly upward until the maximum displacement point of the overcenter cam is reached. As the shield continues to pivot toward the closed position, the shield moves slightly downward until the fully closed position is reached. The overcenter cam urges the shield 14 toward the closed position when the shield is positioned between the closed position and the maximum displacement point of the overcenter cam and urges the shield toward the open position when the shield is positioned between the open position and the maximum displacement point of the overcenter cam.

Figure 10:
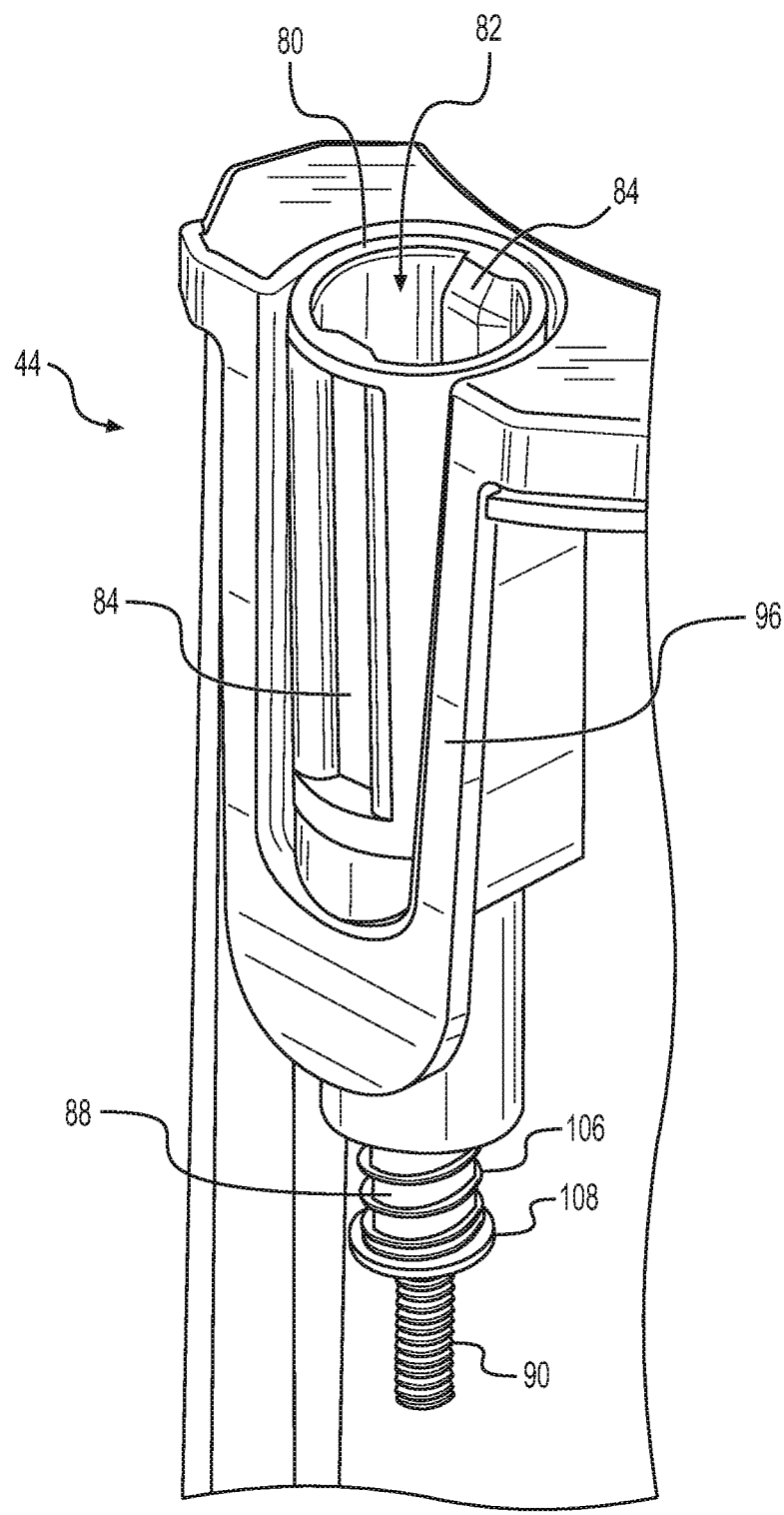
FIG. 10 is a close-up perspective view of the pivot point of the blender of FIG. 1.
Figure 11:
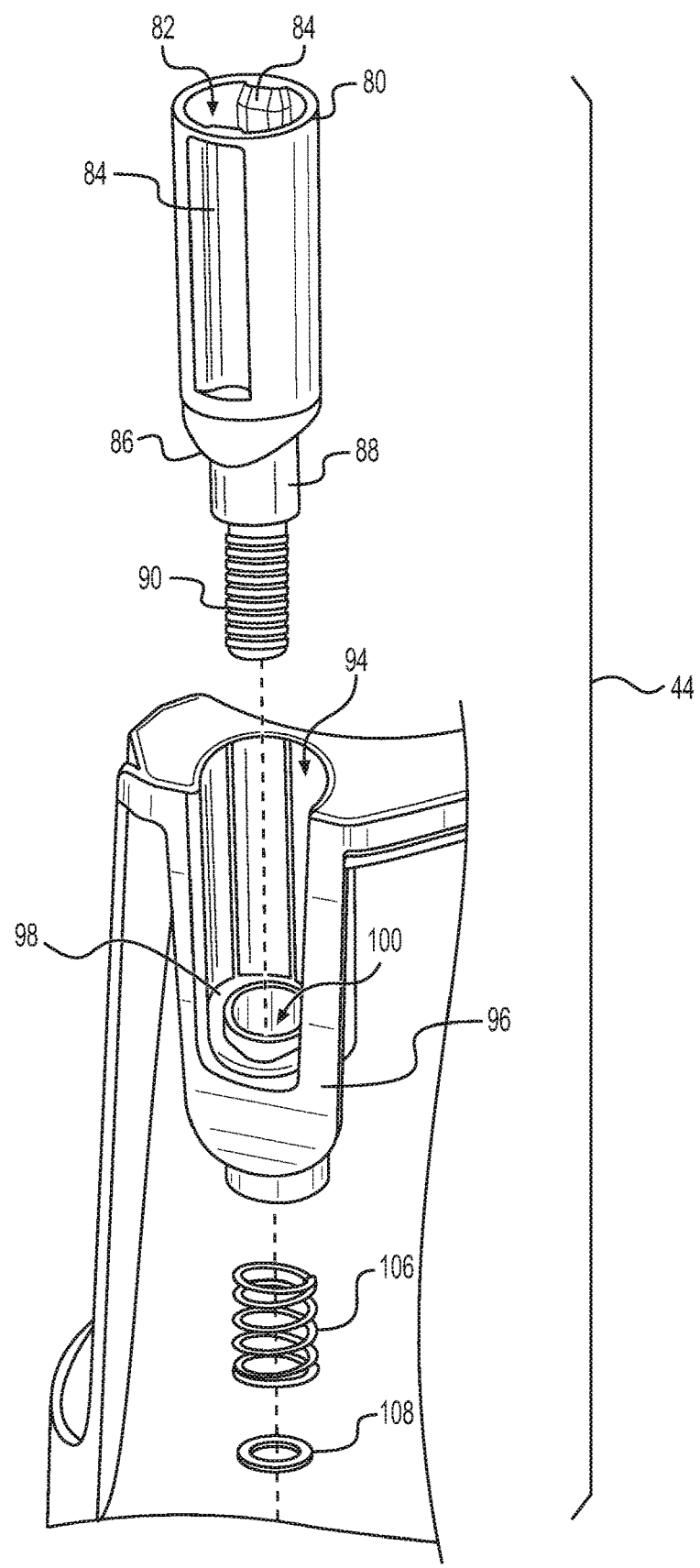
FIG. 11 is a close-up perspective exploded view of the pivot point of the blender of FIG. 1.
Figure 12:
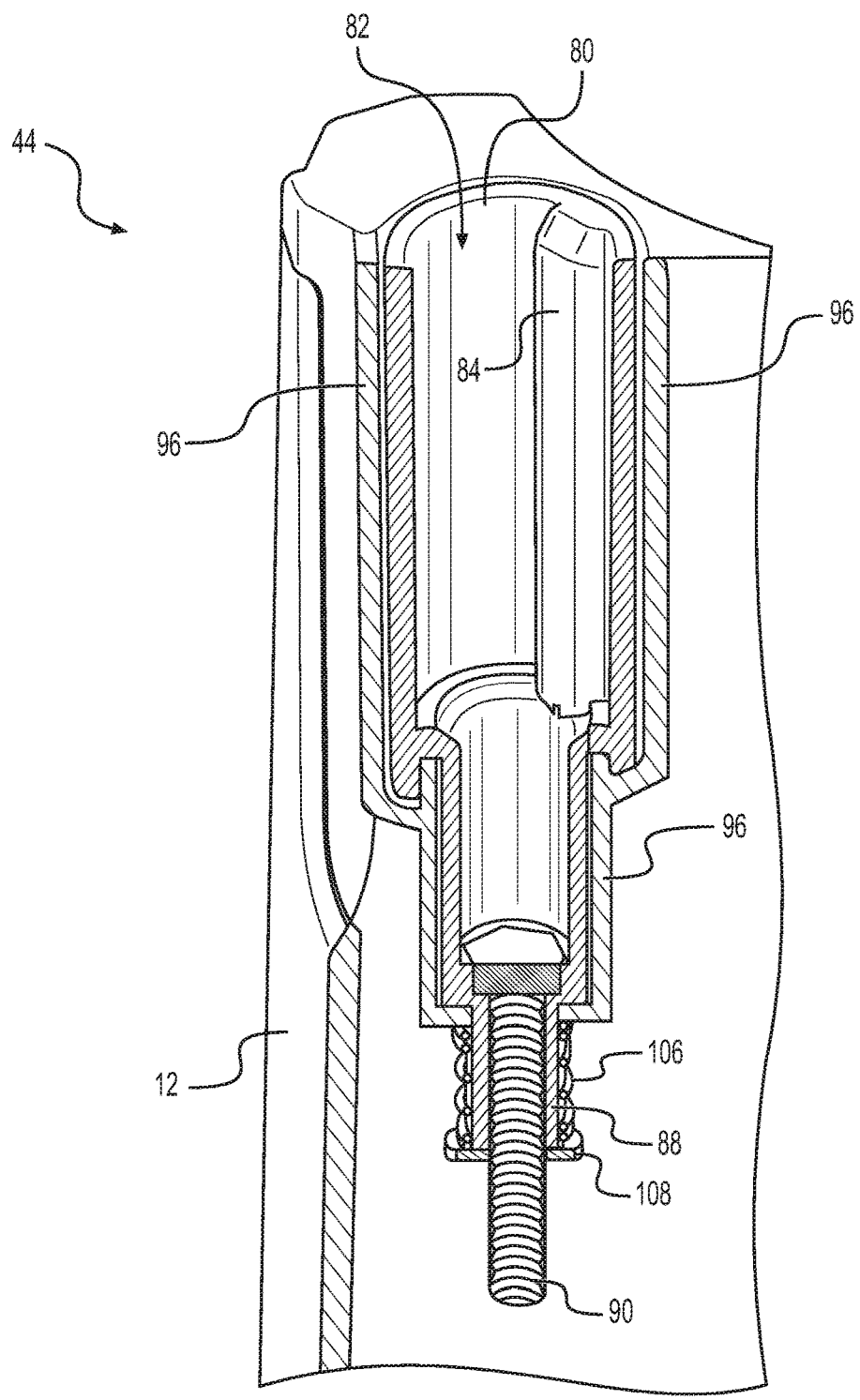
FIG. 12 is a close-up perspective cross-sectional view of the pivot point of the blender of FIG. 1.
Figure 13:
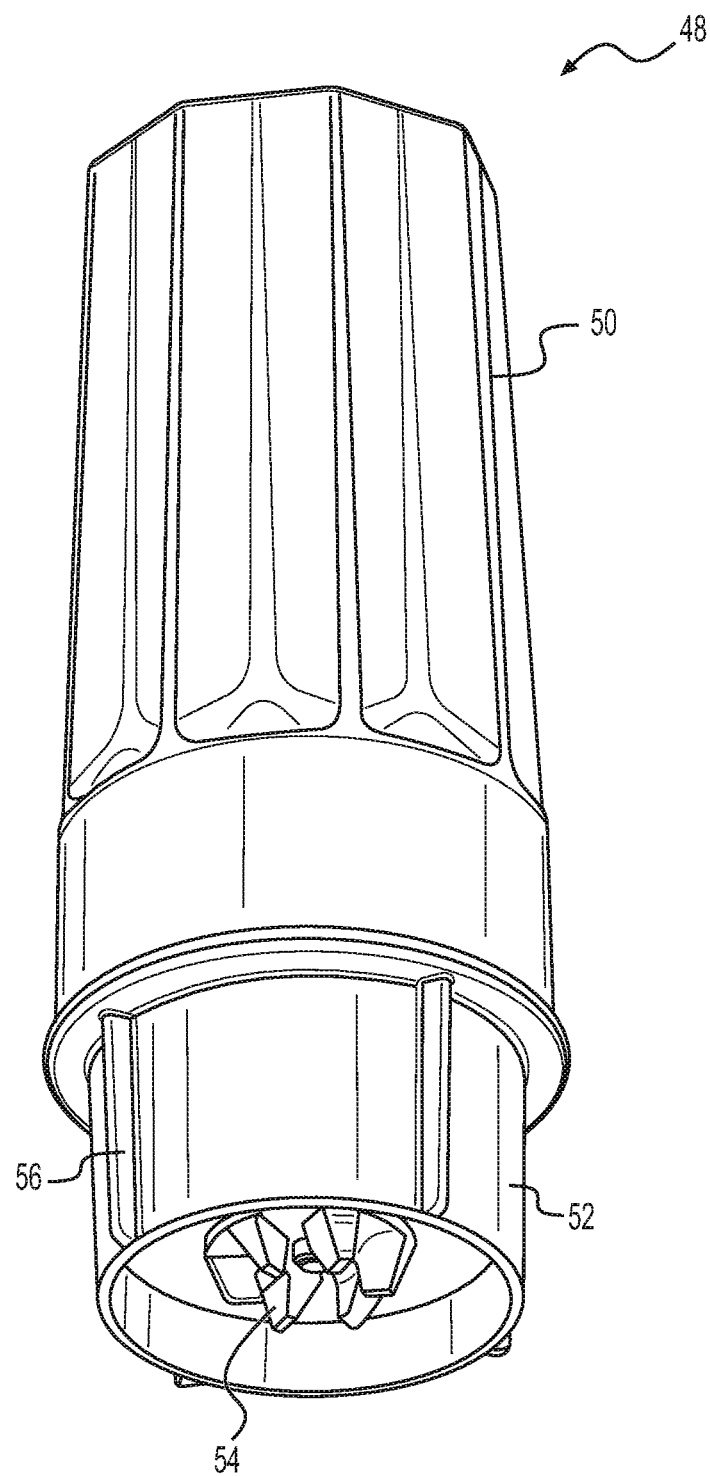
FIG. 13 is a bottom front perspective view of the blender jar assembly of the blender of FIG. 1, removed from the blender.
Figure 14:
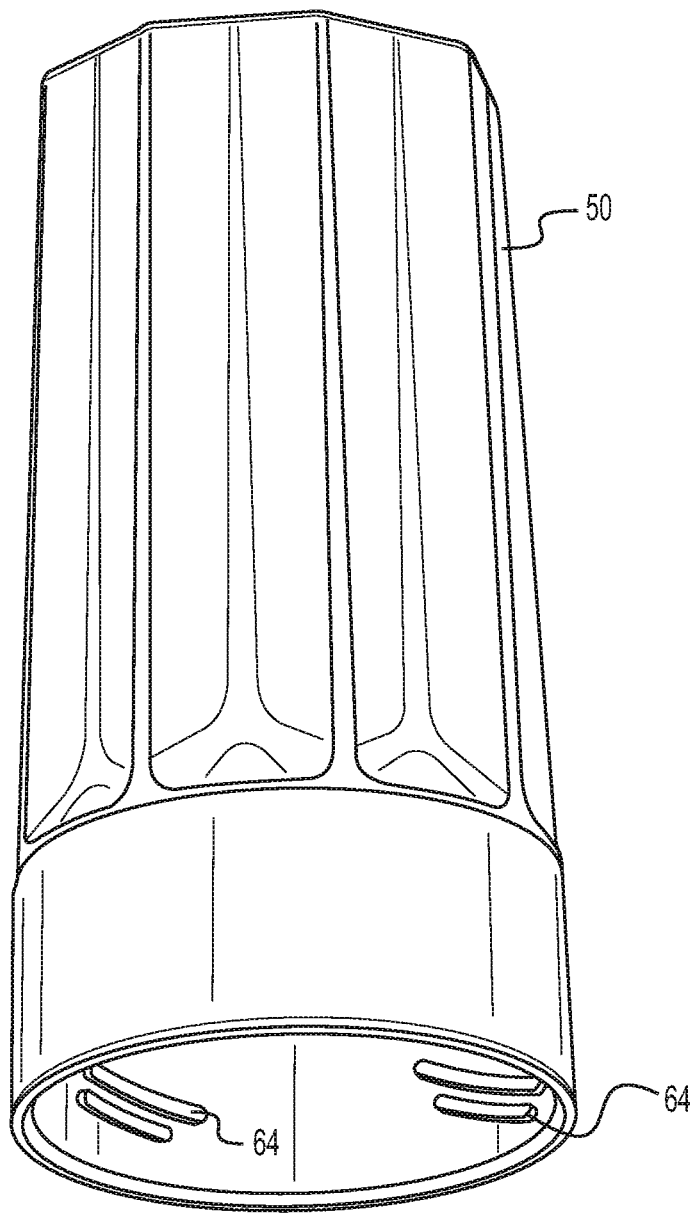
FIG. 14 is a bottom front perspective view of the base of the blender jar assembly of FIG. 13, separated from the container.

The structural details of the pivot point overcenter cam are visible in FIGS. 9-12. In FIGS. 10-12, the housing 12 has been removed for clarity. FIG. 12 further shows the pivot point in cross-section along line A-A of FIG. 9. The pivot point 44 comprises a top cam portion 80, a bottom cam portion 96 that cooperates with the top cam portion, a spring 106 that biases the top and bottom cam portions together, and a washer 108, nut, or other similar retaining element.

As best seen in FIG. 11, the top cam portion 80 comprises an upper portion that defines a substantially vertical void 82, two opposing elongated keys 84 that project into the void 82, a cam surface 86, and a post 88 projecting downward from the upper portion. The post 88 has a smaller diameter than the upper portion to allow for the cam surface 86. The lower portion of the post 88 has threads 90. The cam surface 86 is a downwardly projecting multi-level curved surface, in that the cam surface has two opposing thick spots and two opposing thin spots with a sloped surface in between each thick and thin spot. When the shield 14 is mounted to the blender 10, the post 74 of the shield is inserted into the void 82 of the top cam portion, with the keyways 76 of the shield post aligned and engaged with respective ones of the keys 84 of the top cam portion 80. The engagement between the keyways 76 and the keys 84 ensures that the shield 14 is properly aligned and ensures that pivoting of the shield 14 causes the top cam portion 80 to correspondingly rotate.

The bottom cam portion 96 defines a substantially vertical void 94 for receiving the upper portion of the top cam portion 80. The bottom cam portion 96 further defines a smaller diameter substantially vertical lower void 100 for receiving the post 88 of the top cam portion 80. The bottom cam portion 96 comprises a cam surface 98. Cam surface 98 is an upwardly projecting multi-level curved surface, in that the cam surface has two opposing thick spots and two opposing thin spots with a sloped surface in between each thick and thin spot.

When the top cam portion 80 is in place in the bottom cam portion 96, at least part of the post 88 and the threaded portion 90 project out of the bottom of the bottom cam portion 96, as seen in FIGS. 10 and 12. The spring 106 is positioned on the post 88 and is sandwiched between the bottom of the bottom cam portion 96 and the washer 108 or other similar retaining element. In this regard, when the top cam portion moves upward (as described below), the spring 106 is compressed between the bottom of the bottom cam portion 96 and the washer 108. The compressed spring 106 exerts a downward biasing force on the washer 108 and therefore on the top cam portion 80 to bias the top cam portion 80 toward the bottom cam portion 96.

The cam surface 86 of the top cam portion 80 and the cam surface 98 of the bottom cam portion 96 have cooperating contours. In this regard, when the shield 14 is in place on the blender and in the fully closed or the fully open position, the opposing thick spots of the cam surface 86 cooperate with corresponding ones of the opposing thin spots of the cam surface 98 and the opposing thin spots of the cam surface 86 cooperate with corresponding ones of the opposing thick spots of the cam surface 98. In other words, the cam surface 86 and the cam surface 98 nest or seat together uniformly when the shield 14 is in place on the blender and in the fully closed or the fully open position.

When the shield 14 is pivoted from the closed position to the open position, the top cam portion 80 correspondingly rotates. As the top cam portion 80 rotates, the opposing thick spots of the cam surface 86 move away from the opposing thin spots of the cam surface 98 and toward the opposing thick spots of the cam surface 98, thereby causing the top cam portion 80 and therefore the shield 14 to rise vertically a small amount (the amount of rise is based on the contours of the cam surfaces 86, 98). As mentioned above, as the top cam portion 80 rises, the spring 106 is compressed between the bottom of the bottom cam portion 96 and the washer 108 and exerts a downward biasing force on the washer 108 and therefore on the top cam portion 80 to bias the top cam portion 80 toward the bottom cam portion 96. This has the effect of biasing the shield 14 toward the closed position at this point in the pivoting of the shield 14.

As the shield 14 continues to be pivoted from the closed position to the open position, at about the midpoint between the closed and open positions (but does not necessarily have to be at the midpoint) the opposing thick spots of the cam surface 86 will align with the opposing thick spots of the cam surface 98. This point may be termed the maximum displacement point, and at this point the top cam portion 80 and the shield 14 are at their highest position.

As the shield 14 continues to be pivoted from the closed position to the open position past the maximum displacement point, the opposing thick spots of the cam surface 86 move away from the opposing thick spots of the cam surface 98 and toward the opposing thin spots of the cam surface 98 (but the opposite thin spots than when the shield was in the closed position), thereby causing the top cam portion 80 and therefore the shield 14 to begin to lower. Now the compressed spring 106 biases the shield 14 toward the open position due to the slopes of the cam surfaces 86, 98. When the shield 14 is in the fully open position, the opposing thick spots of the cam surface 86 cooperate with corresponding ones of the opposing thin spots of the cam surface 98 and the opposing thin spots of the cam surface 86 cooperate with corresponding ones of the opposing thick spots of the cam surface 98 (but the opposite thin spots than when the shield was in the closed position). In other words, the cam surface 86 and the cam surface 98 nest or seat together uniformly when the shield 14 is in place on the blender and in the fully closed or the fully open position (but opposite of when the shield was in the closed position).

Thus, when the shield 14 is in the fully closed or fully open position, the overcenter cam provides a biasing force to keep the shield in its fully closed or fully open position. When the shield is pivoted from closed to open or from open to closed, the overcenter cam provides a biasing force either toward the closed position or toward the open position, depending on whether the top cam portion 80 is on the closed or open side of the maximum displacement point.

Figure 11A:
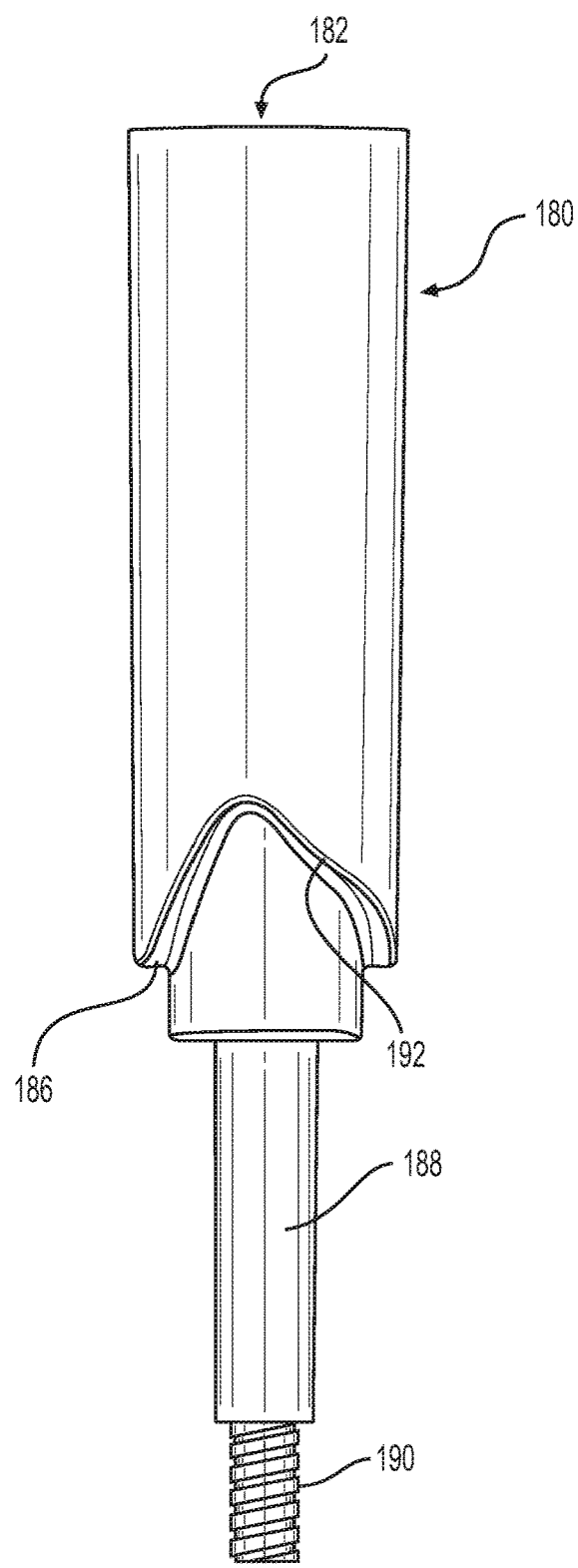
FIGS. 11A and 11B are close-up perspective views of alternative pivot point components.
Figure 11B:
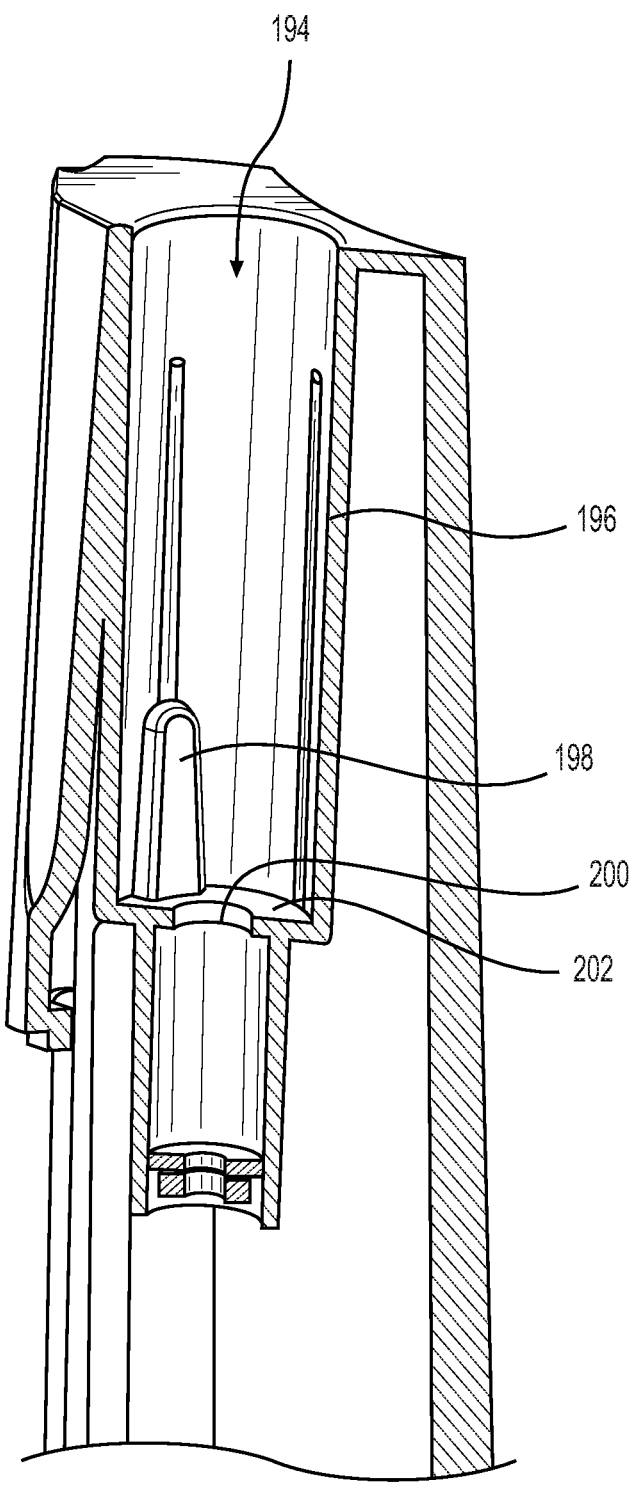

FIGS. 11A and 11B illustrate pivot point components of an alternative embodiment of the present disclosure. FIG. 11A illustrates a top cam portion 180 that comprises an upper portion that defines a substantially vertical void 182 (not illustrated) with two opposing elongated keys (not illustrated) that project into the void, a cam surface 186, and a post 188 projecting downward from the upper portion. The lower portion of the post 188 has threads 190. While the cam surface 186 is only visible on one side of top cam portion 180 in FIG. 11A, the unseen portion of the cam surface on the opposite side of the top cam portion 180 is identical to the visible portion. The cam surface 186 of the top cam portion 180 differs from the cam surface 86 of the top cam portion 80 in that the cam surface 186 is not symmetric, has a greater height, is steeper, and has a wavy portion or bump 192. The greater height of the cam surface 186 causes the cam surface 186 and therefore the shield to rise higher during opening and closing to provide greater clearance. The steeper angle of the cam surface 186 (potentially along with using a stronger spring) provides a greater closing force on the shield. The bump 192 on the cam surface 186 slows the rotation of the top cam portion 180 and therefore the opening speed of the shield.

FIG. 11B illustrates a bottom cam portion 196 that defines a substantially vertical void 194 for receiving the upper portion of the top cam portion 180. The bottom cam portion 196 further defines a smaller diameter substantially vertical lower void 200 for receiving the post 188 of the top cam portion 180. Rather than having a cam surface that substantially conforms to the cam surface 186 of the top cam portion 180, the bottom cam portion 196 comprises two opposing upright rounded-top ribs 198 (only one is visible in FIG. 11B) projecting inward from the wall surface of the vertical void 194 and projecting upward from a substantially planar, substantially horizontal floor 202. The ribs 198 engage with opposing sides of the cam surface 186 of the top cam portion 180 to cause the top cam portion 180 (and correspondingly the shield) to rise and lower as the shield is rotated, as in the embodiment described above. The ribs 198 of FIG. 11B reduce the amount of surface contact, and therefore the amount of friction, between the cam surfaces of the top cam portion 180 and the bottom cam portion 196.

In alternative embodiments of the present disclosure, the overcenter cam may be overindexed, such that the shield reaches its fully closed position before the overcenter cam reaches its fully closed position. In this regard, the overcenter cam continues to apply a closing force to the shield when the shield is fully closed, thereby helping to retain the shield in its closed position.

Referring now to FIGS. 13-16, a blender jar assembly such as may be used in conjunction with a blender of embodiments of the present disclosure is illustrated. The blender jar assembly of embodiments of the present disclosure may also be used in conjunction with blenders other than the embodiments illustrated and described herein. Further, one or more features of the blender jar assembly of embodiments of the present disclosure may be incorporated into other blender jar assemblies other than the embodiments illustrated and described herein. The blender jar assembly 48 comprises a base 52 and a container portion 50 that may be selectively coupled to the base 52. The blender 10 and blender jar assembly 48 may together be termed a personal (or single-serving) blender, as the container portion 50 functions as both the blending chamber when selectively coupled to the base 52 and as a drinking vessel when separated from the base 52. (This is in contrast to a multi-serving or full size blender in which the container has an open top end (with a removable/replaceable lid) for receiving foodstuff to be blended and for dispensing the blended foodstuff into a separate drinking vessel.

Since the container portion 50 doubles as a drinking vessel, the container portion 50 is generally shaped like a drinking vessel, being generally cylindrical or frusto-conical with one closed, flat end and one open end, although any other suitable shape may be used. The open end of the container portion 50 is selectively coupled to the base 52 via internal threads 64 on the container portion 50 (adjacent the open end) and external threads 58 on the base 52. This is in contrast to conventional personal blenders in which the container portion has external threads to engage with internal threads on the base. Such external threads on the container portion may be undesirable as they may feel uncomfortable to a user while drinking from the container or may cause the blended foodstuff to leak around the user's mouth if drinking from the container without a lid in place. In contrast, the internal threads on the container portion of embodiments of the present disclosure are typically not noticeable to a user and therefore more comfortable while drinking from the container, as well as being unlikely to cause a leak while the user is drinking.

The container portion 50 is preferably constructed of a transparent, generally rigid material that is able to withstand the normal operating conditions of the container portion 50. For example, the container portion 50 may be constructed of a generally rigid, injection molded polymeric material that is at least partially transparent such that foodstuff within the container portion 50 may be viewed by a user. However, the container portion 50 is not limited to a specific embodiment or being constructed of a transparent material or to being constructed of an injection molded polymeric material. Rather, the container portion 50 may be constructed of nearly any generally rigid material that is able to take on the general shape of the container portion 50 and withstand the normal operating conditions of the container portion 50, for example, glass, stainless steel, or aluminum.

The base 52 comprises a floor 55 and a sidewall 53 connected to and extending from the floor to form a chamber for receiving at least a portion of the foodstuff to be blended. Substantially vertical ribs 56 protrude from the exterior of the sidewall 53 to engage the vertical edges of the octagonal lower wall portion 28 of the chamber 26 to provide the desired snug fit. Four ribs 56 are illustrated, although any suitable number of ribs may be used.

The base 52 further comprises one or more rotatable blades 60 for blending/mixing the foodstuff. The blades 60 are attached to a shaft 114 that extends through a shaft support 112 and attaches to a coupling clutch 54 on the underside of the base 52. As described above, the clutch coupling 32 operatively engages with the coupling clutch 54 of the base when the blender jar assembly 48 is in position in the chamber 26 for blending. Operation of the motor 42 rotates the clutch coupling 32, which rotates the coupling clutch 54, which rotates the shaft 114, which rotates the blades 60 to blend the foodstuff in the blender jar assembly.

In a conventional blender jar assembly, the blades extend into the container portion. When putting foodstuff to be blended into the container portion of a personal blender, the container portion is separated from the base and inverted such that the open end is up. If a user completely fills the container portion to its top rim and a conventional base is attached, the blades (which conventionally extend beyond the base and into the container portion) will displace some of the foodstuff as the base is attached and may cause some of the foodstuff to overflow the container portion. Further, when the coupled container portion and base are inverted again such that the base is on the bottom (for insertion into a blender), such a full container portion does not provide the desired headspace (i.e., space between the top level of the foodstuff and the top end or lid of the container portion). Headspace is important to create a vortex during the blending operation, which helps prevent overload of the motor.

Figure 15:
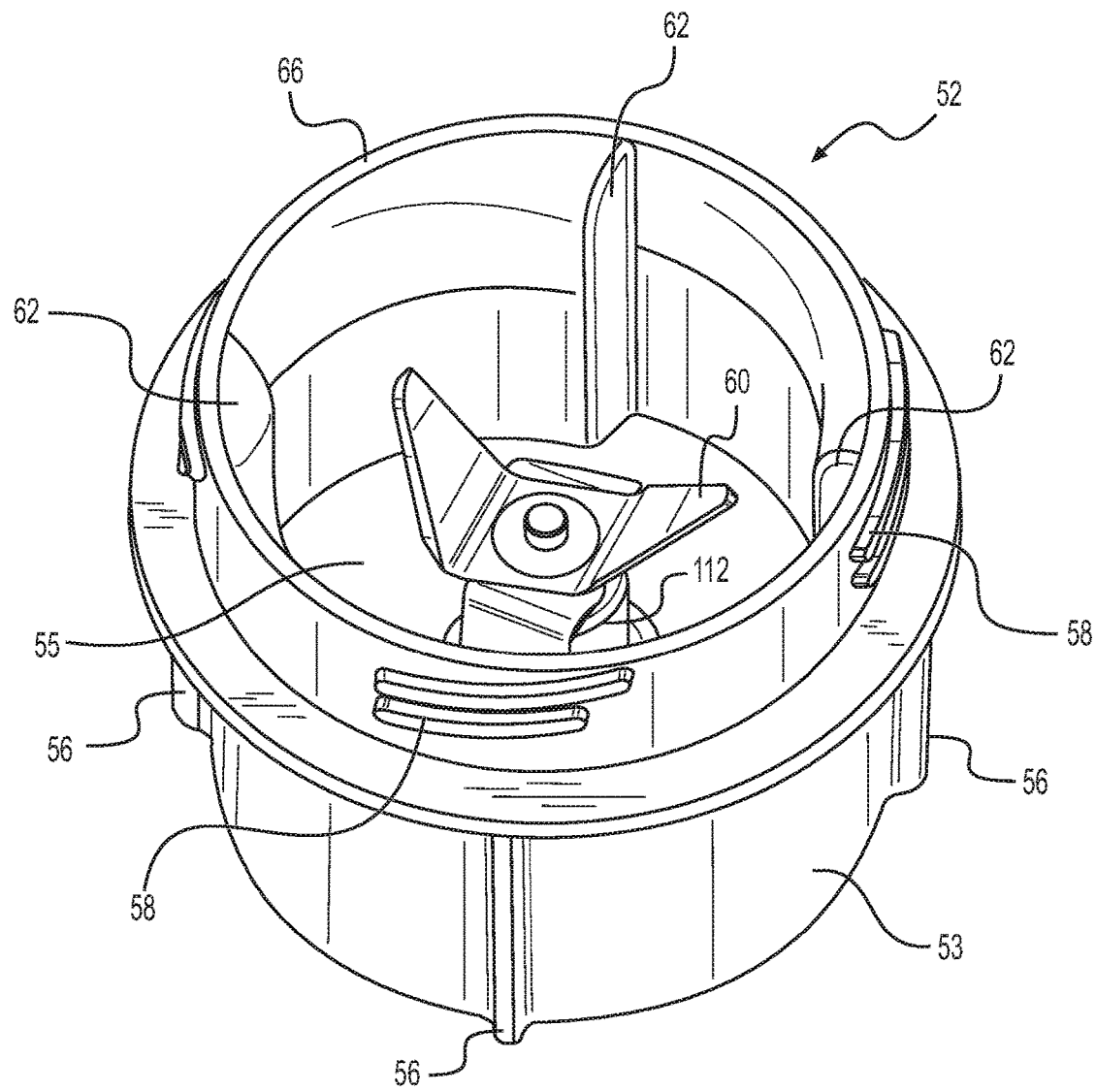
FIG. 15 is a top front perspective view of the base of FIG. 14.
Figure 16:
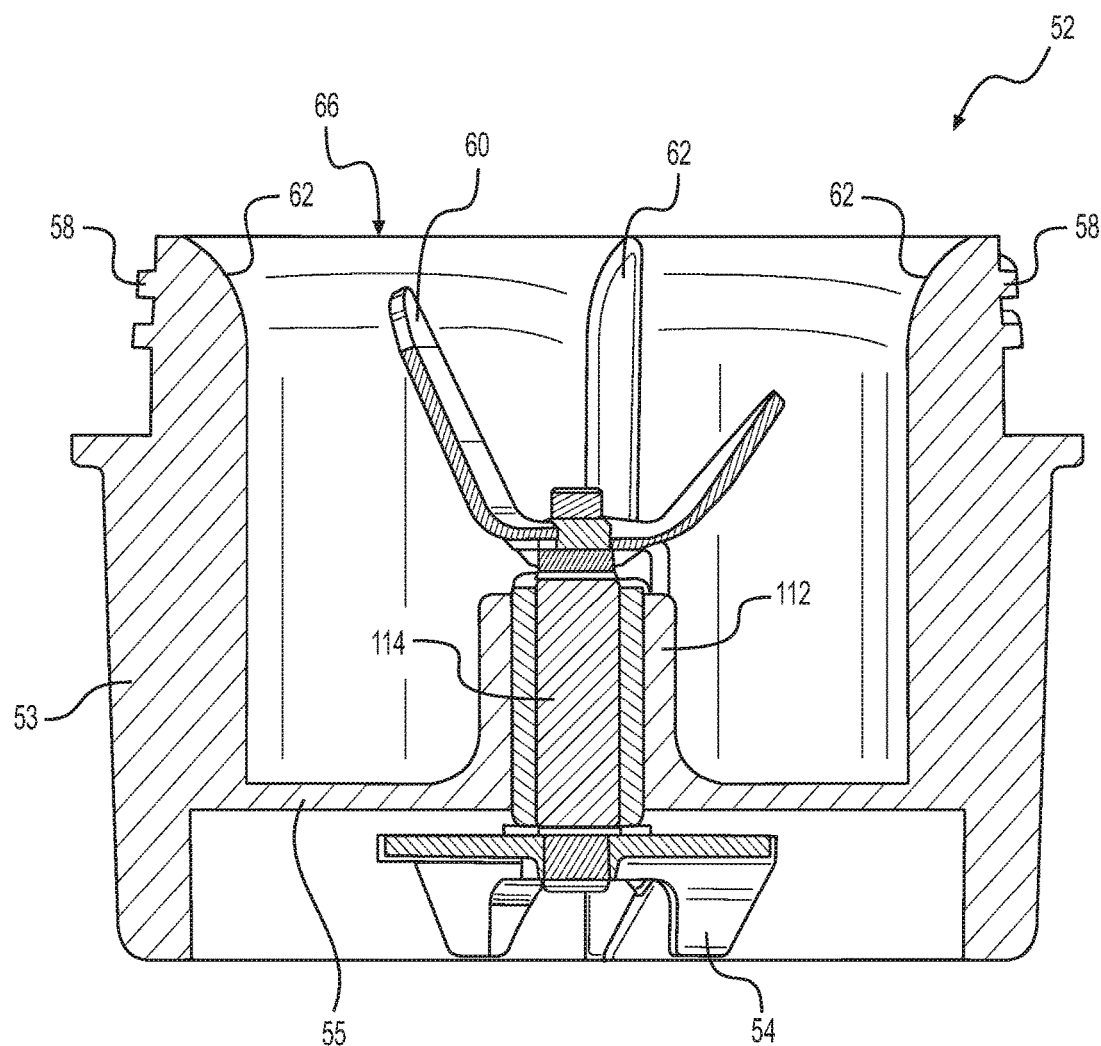
FIG. 16 is a front cross-sectional view of the base of FIG. 14.

Advantageously, in the embodiment illustrated in FIGS. 13-16, the rotatable blades 60 are fully contained within the chamber formed by the floor 55 and the sidewall 53. That is, the rotatable blades 60 do not extend beyond a rim 66 of the sidewall 53, as seen in FIG. 16. Therefore, the rotatable blades 60 do not extend into the container portion. The illustrated arrangement in which the blades are fully contained within the base and do not extend above the base into the container portion has advantages over conventional blender jar assemblies in which the blades extend into the container portion. Regardless of how much foodstuff a user puts into the container portion 50, the blades 60 will not displace any of the foodstuff or cause any of the foodstuff to overflow the container portion 50 as the base 52 is attached. Further, when the coupled container portion 50 and base 52 are inverted again such that the base is on the bottom (for insertion into a blender), some of the foodstuff in the container portion 50 will fall into the chamber of the base 52 from the container portion 50, thereby creating the desired headspace in the container portion 50. The illustrated arrangement in which the blades are fully contained within the base and do not extend above the base into the container portion may be used in conjunction with a multi-serving, full size container portion, and not just with the illustrated personal blender type container portion.

In conventional blender jar assemblies, it is known to modify the geometries of the container portion to disrupt the laminar flow of the foodstuff (i.e., introducing turbulence) during the blending operation. Such disruption improves the blending process and results in a more uniform blending of the foodstuff. Such modifications to the geometry of the container portion include inward protrusions, such as bumps, ribs, ridges, and the like. Manufacturing a container portion with such inward protrusions can be more complex and expensive than manufacturing a container portion without such inward protrusions.

Advantageously, in the embodiment illustrated in FIGS. 13-16, the desired inward protrusions 62 are formed on the sidewall 53 of the base 52 (rather than on the container portion 50). In the illustrated embodiment, there are four such protrusions 62 spaced about the sidewall 53, although any suitable number of protrusions may be used. The protrusions 62 each curve inward and end in a vertical plateau, as seen in FIG. 15, although any suitable type of protrusions may be used. Because the blades 60 are within the chamber of the base 52, the protrusions 62 provide the desired increased agitation of the foodstuff within the chamber. Having the protrusions within the base 52 enable the use of a more powerful motor and larger blades without risking breaking the container portion. The illustrated arrangement in which the desired inward protrusions are formed in the base (rather than in the container portion) may be used in conjunction with a multi-serving, full size container portion, and not just with the illustrated personal blender type container portion.

Figure 17:
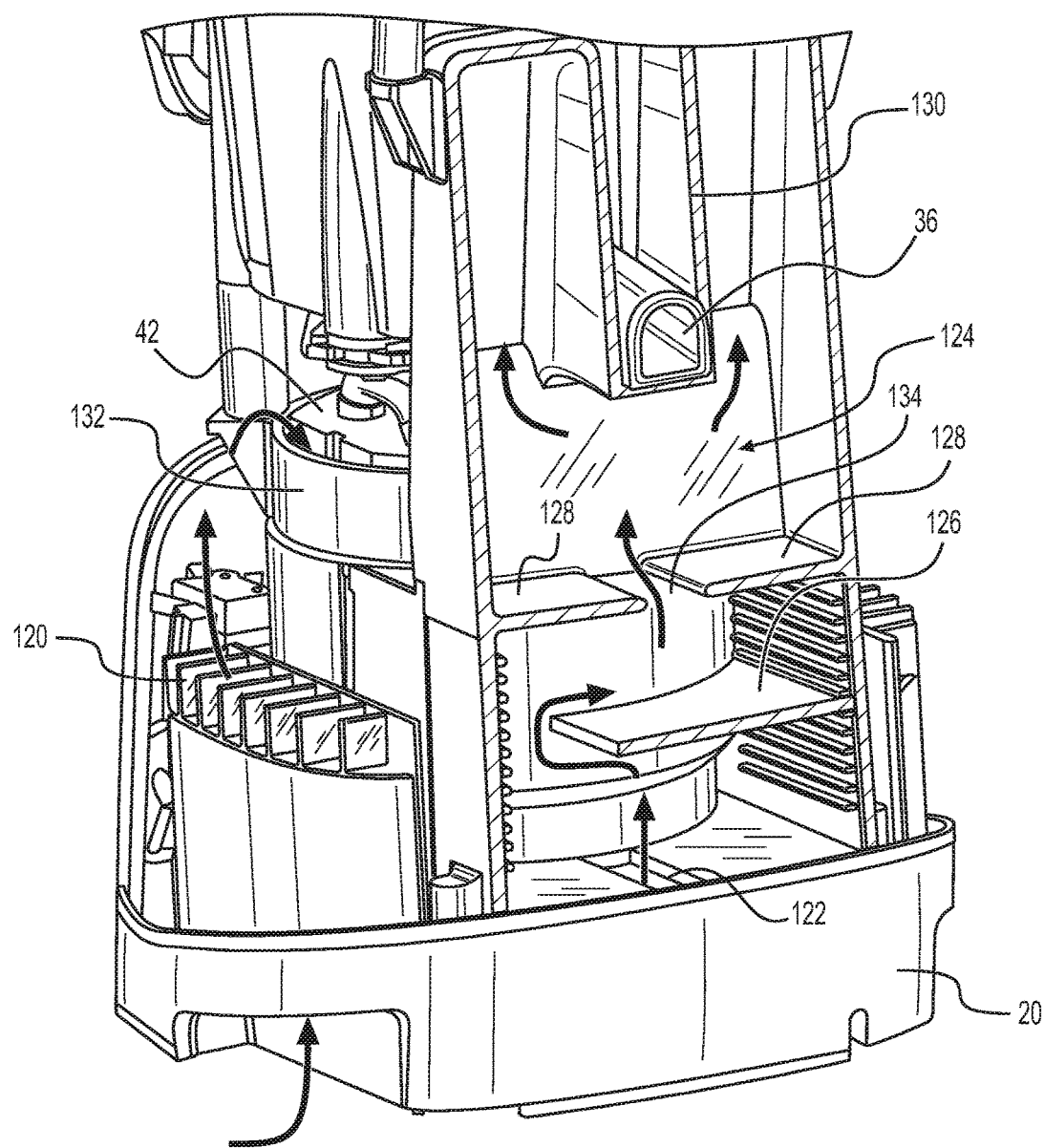
FIG. 17 is a right rear perspective cutaway view of the blender of FIG. 1.

In a conventional blender, it is known to use a fan (typically driven by the motor shaft) to draw air into the blender housing (typically through intake vents in the housing base) and across the motor to provide a desired cooling of the motor, and to exhaust the heated air through one or more exhaust vents. While such air cooling is desirable, the vented air carries noise from the motor out of the housing, resulting in an undesirably noisy operation of the blender. Referring now to FIG. 17, a blender of embodiments of the present disclosure provides a muffler within the housing of the blender. The muffler provides an internal chamber 124 that directs the vented air in such a way as to reduce the noise emitted and change its frequency. As indicated by the bold arrows in FIG. 17, air is drawn by a fan (not illustrated) into the base 20 of the blender via one or more air intake vents (not illustrated). The air is directed across cooling fins 120 and then drawn down into a motor shroud 132 that surrounds the motor 42, thereby directing air across and cooling the motor 42. The directed air continues down into the interior of the base 20 and then up through a central restricted opening 122 into the muffler chamber 124. The air coming up through the restricted opening 122 hits obstruction 126 that projects out from one side of the muffler chamber 124, causing the air to be directed around the distal end of the obstruction 126. The air then goes through another central restricted opening 129 that is formed by two obstructions 128 that project out from opposing sides of the muffler chamber 124. The air then hits an obstruction 130 which bisects the air flow (bisecting obstruction 130 also provides a path for the drain channel which leads from the drain hole 34 to the exit hole 36) and directs the air flow out of the blender housing via the two output vents (best seen in FIG. 7).

It will be appreciated by those skilled in the art that changes could be made to the embodiments described above without departing from the broad inventive concept thereof. It is understood, therefore, that this disclosure is not limited to the particular embodiments disclosed, but it is intended to cover modifications within the spirit and scope of the present disclosure as defined by the appended claims.

That which is claimed:

1. A blender for blending foodstuff, the blender comprising:
   a housing having a first portion enclosing a motor and a second portion for selectively receiving a blender jar assembly adapted to contain foodstuff to be blended, the second portion defining an opening through which the blender jar assembly is selectively received; and
   a shield selectively coupled to the second portion via a substantially vertical pivot, the pivot enabling the shield to be selectively pivoted between a closed position closing off the opening in the second portion and an open position enabling the blender jar assembly to be inserted into or removed from the second portion.

2. The blender of claim 1, wherein the pivot further comprises an overcenter cam mechanism that urges the shield toward the closed position when the shield is positioned between the closed position and a maximum displacement point of the overcenter cam and that urges the shield toward the open position when the shield is positioned between the open position and the maximum displacement point of the overcenter cam.

3. The blender of claim 2, wherein the overcenter cam causes the shield to move upward as the shield is pivoted from the closed position to the maximum displacement point of the overcenter cam;
   wherein the overcenter cam causes the shield to move downward as the shield is pivoted from the maximum displacement point of the overcenter cam to the open position;
   wherein the overcenter cam causes the shield to move upward as the shield is pivoted from the open position to the maximum displacement point of the overcenter cam; and
   wherein the overcenter cam causes the shield to move downward as the shield is pivoted from the maximum displacement point of the overcenter cam to the closed position.

4. The blender of claim 2, wherein the overcenter cam comprises a top cam portion, a cooperating bottom cam portion, and a spring that urges the top cam portion and the bottom cam portion toward each other.

5. The blender of claim 4, wherein the shield is selectively coupled to the second portion via the top cam portion such that pivoting the shield causes the top cam portion to correspondingly rotate and such that rotating the top cam portion causes the shield to correspondingly pivot.

6. The blender of claim 5, wherein the shield comprises a pivot post selectively insertable into a corresponding cavity in the top cam portion.

7. The blender of claim 6, wherein the shield pivot post and the cavity of the top cam portion each comprise cooperating engaging surfaces.

8. The blender of claim 1, wherein the blender jar assembly comprises a container selectively coupled to a base, the base comprising a floor and a sidewall connected to and extending from the floor to form a chamber for receiving at least a portion of the foodstuff to be blended, the base further comprising one or more rotatable blades.

9. The blender of claim 8, wherein the one or more rotatable blades are fully contained within the chamber formed by the floor and the sidewall.

10. The blender of claim 8, wherein the one or more rotatable blades do not extend beyond a rim of the sidewall.

11. The blender of claim 9, wherein the sidewall comprises one or more protrusions to increase agitation of the foodstuff within the chamber.

\* \* \* \* \*